Sept. 8, 1959 C. M. RIVELY ET AL 2,903,561
WELDING APPARATUS
Filed May 14, 1957 6 Sheets-Sheet 1
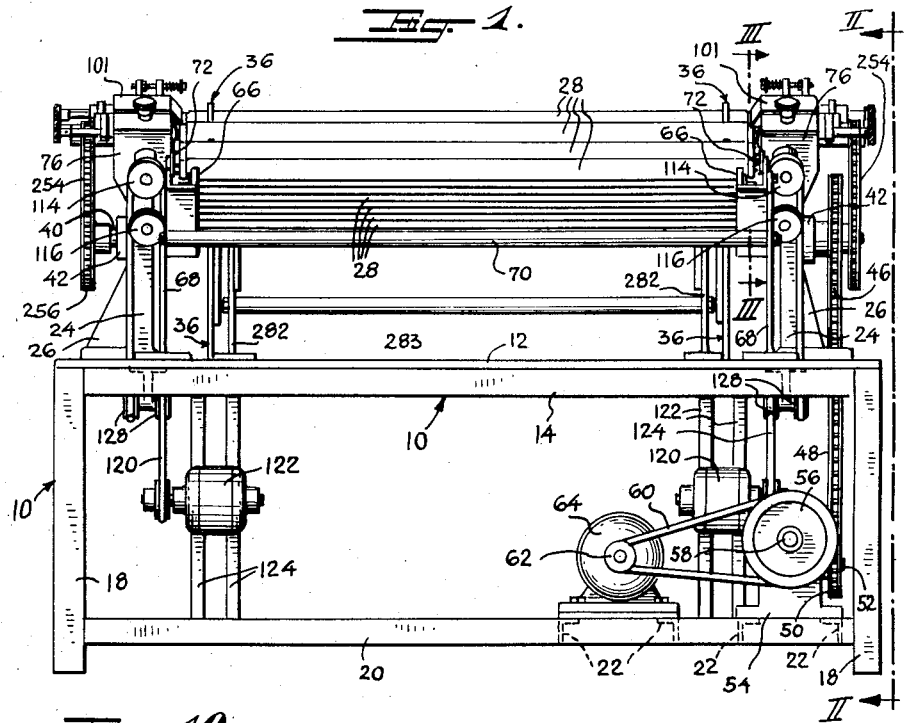
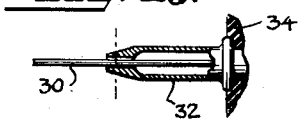
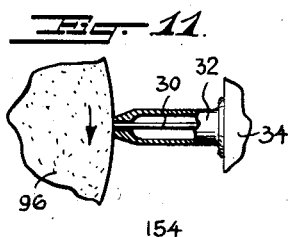
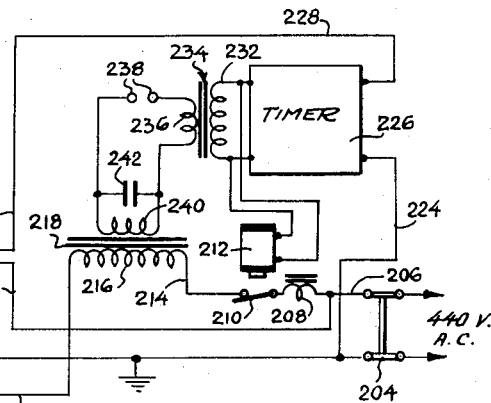
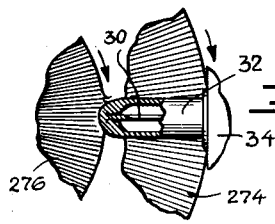
INVENTORS
CLAIR M. RIVELY and
ERIC L. MIDGLEY
BY
ATTORNEY

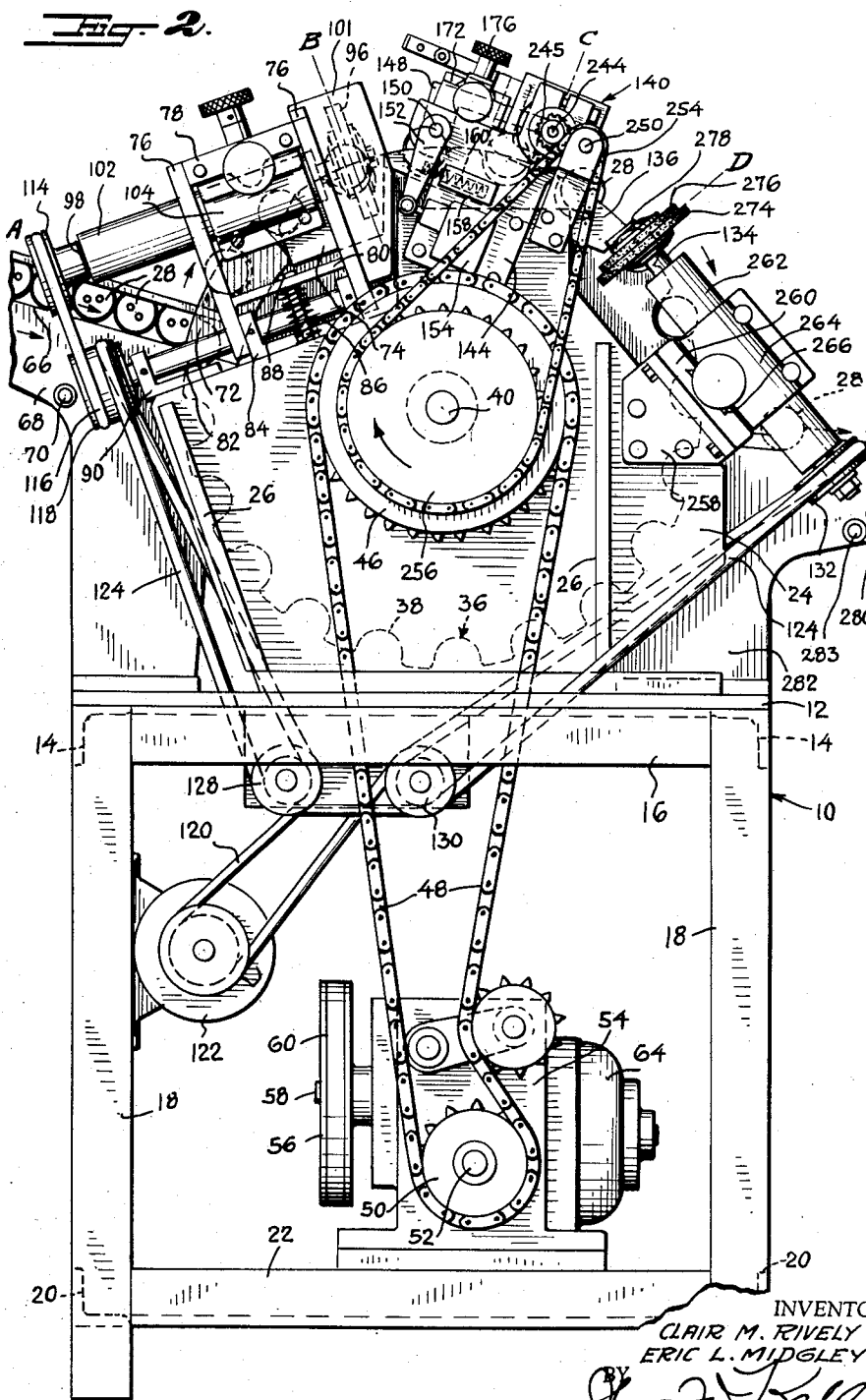

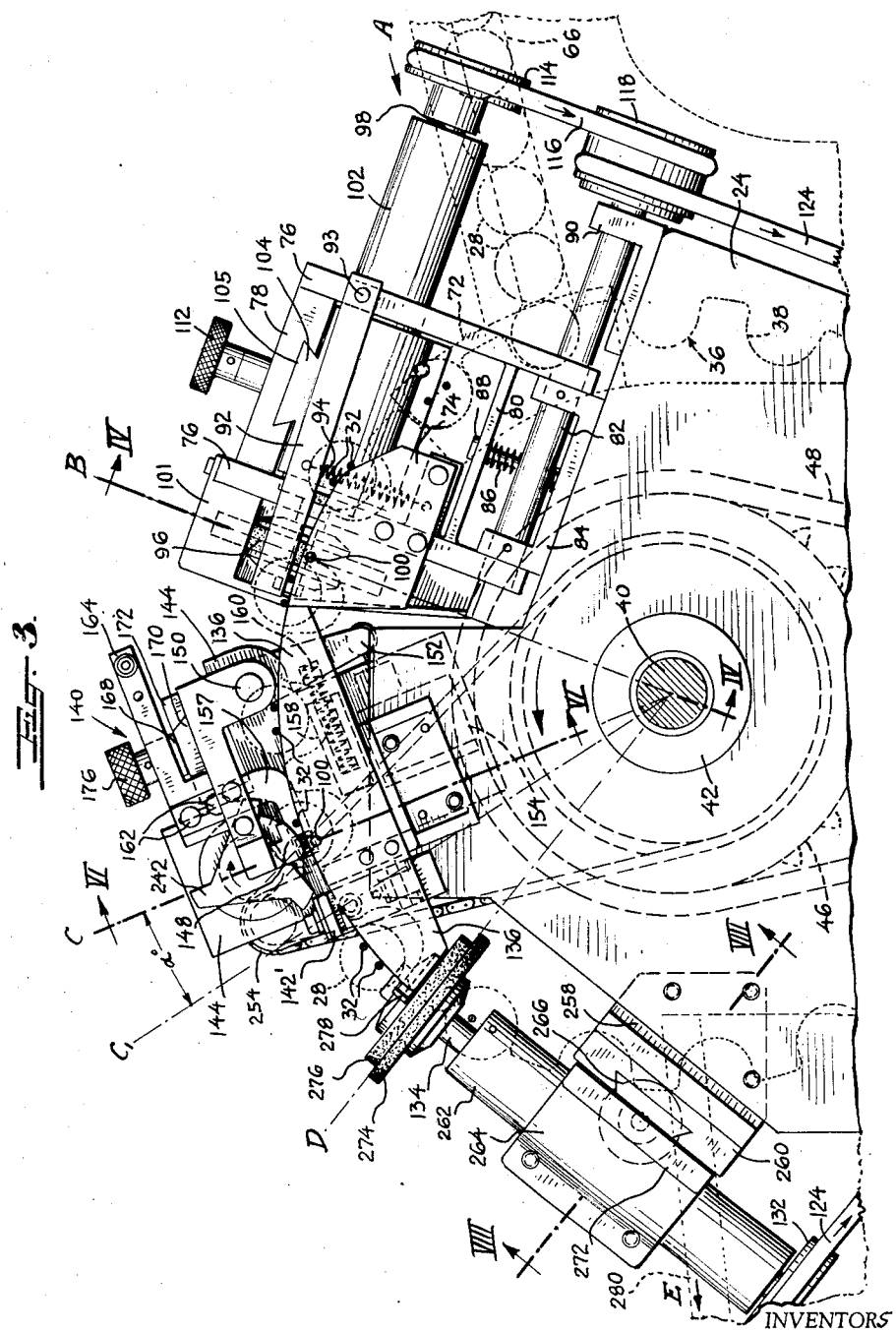

Sept. 8, 1959  C. M. RIVELY ET AL  2,903,561
WELDING APPARATUS
Filed May 14, 1957  6 Sheets-Sheet 4
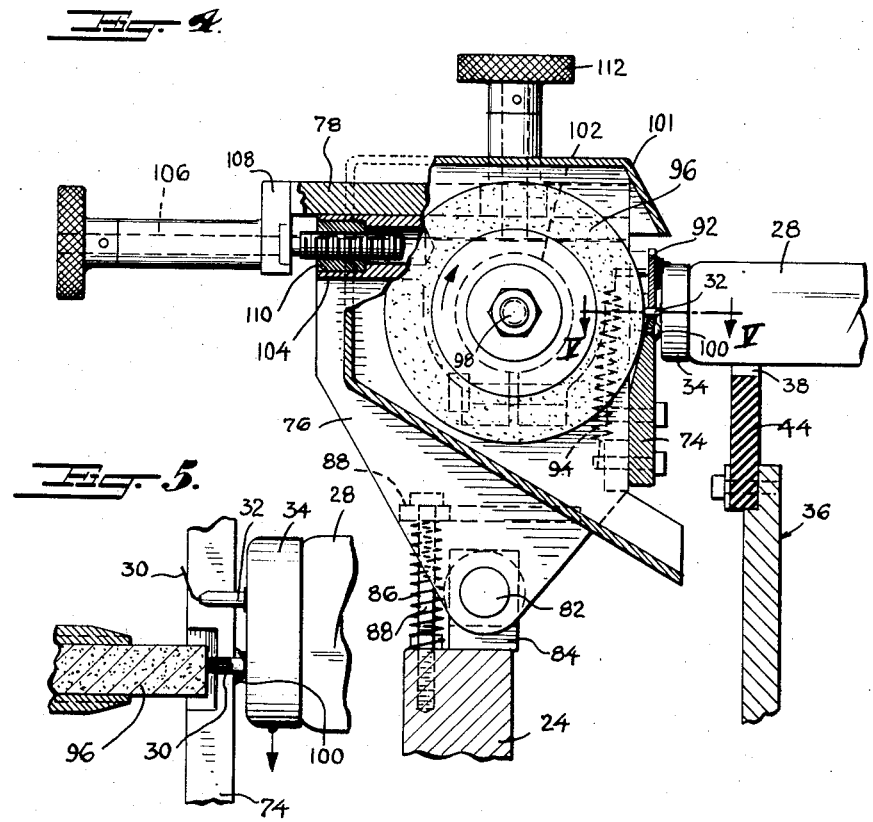
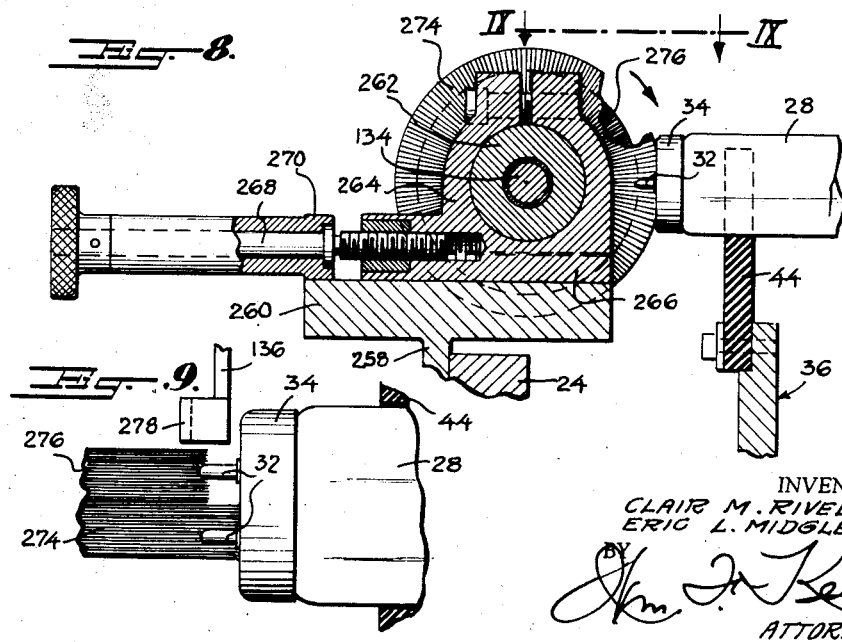
INVENTORS
CLAIR M. RIVELY and
ERIC L. MIDGLEY.
BY
ATTORNEY.

Sept. 8, 1959
C. M. RIVELY ET AL
2,903,561
WELDING APPARATUS
Filed May 14, 1957
6 Sheets-Sheet 5
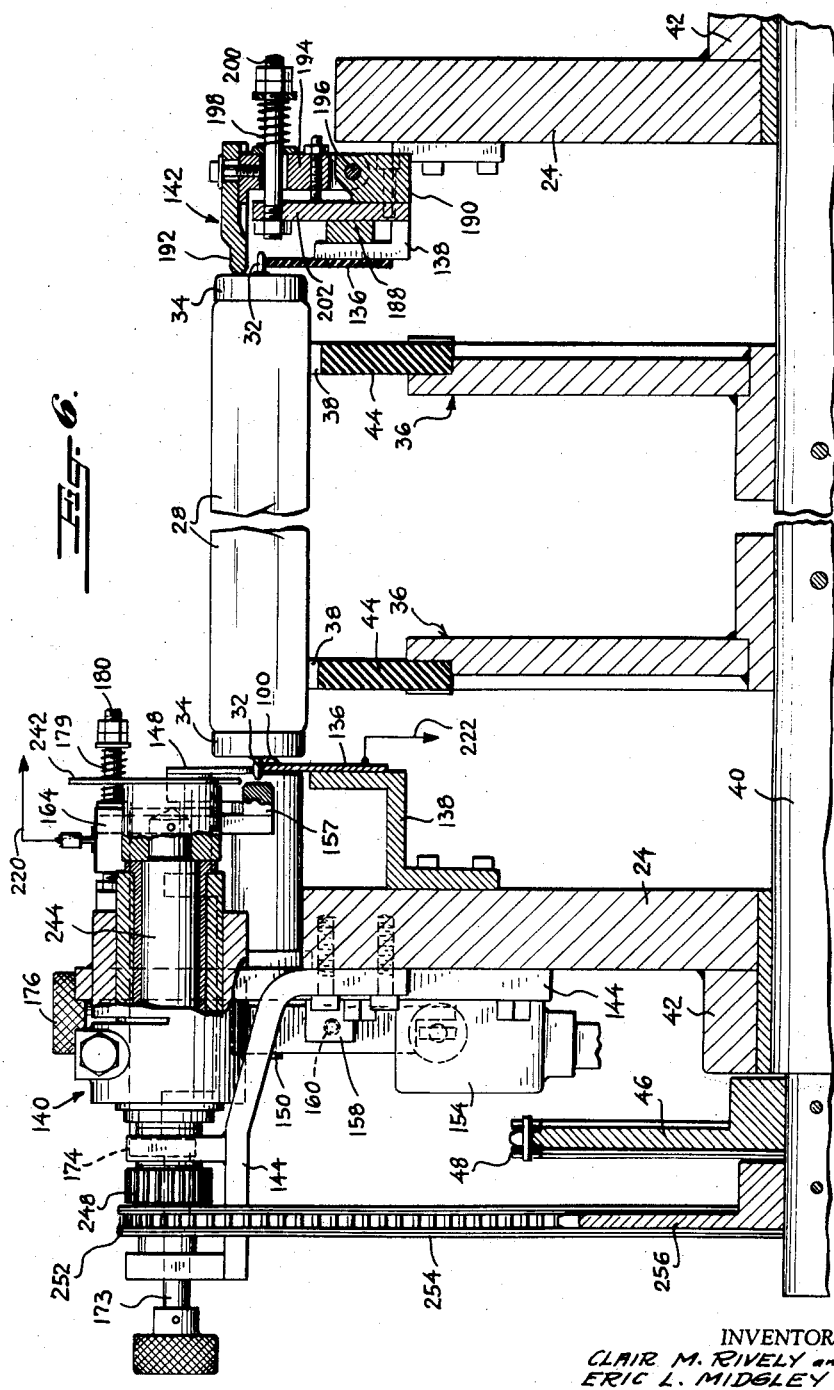
INVENTORS
CLAIR M. RIVELY and
ERIC L. MIDGLEY
BY
ATTORNEY.

Sept. 8, 1959 C. M. RIVELY ET AL 2,903,561
WELDING APPARATUS
Filed May 14, 1957 6 Sheets-Sheet 6
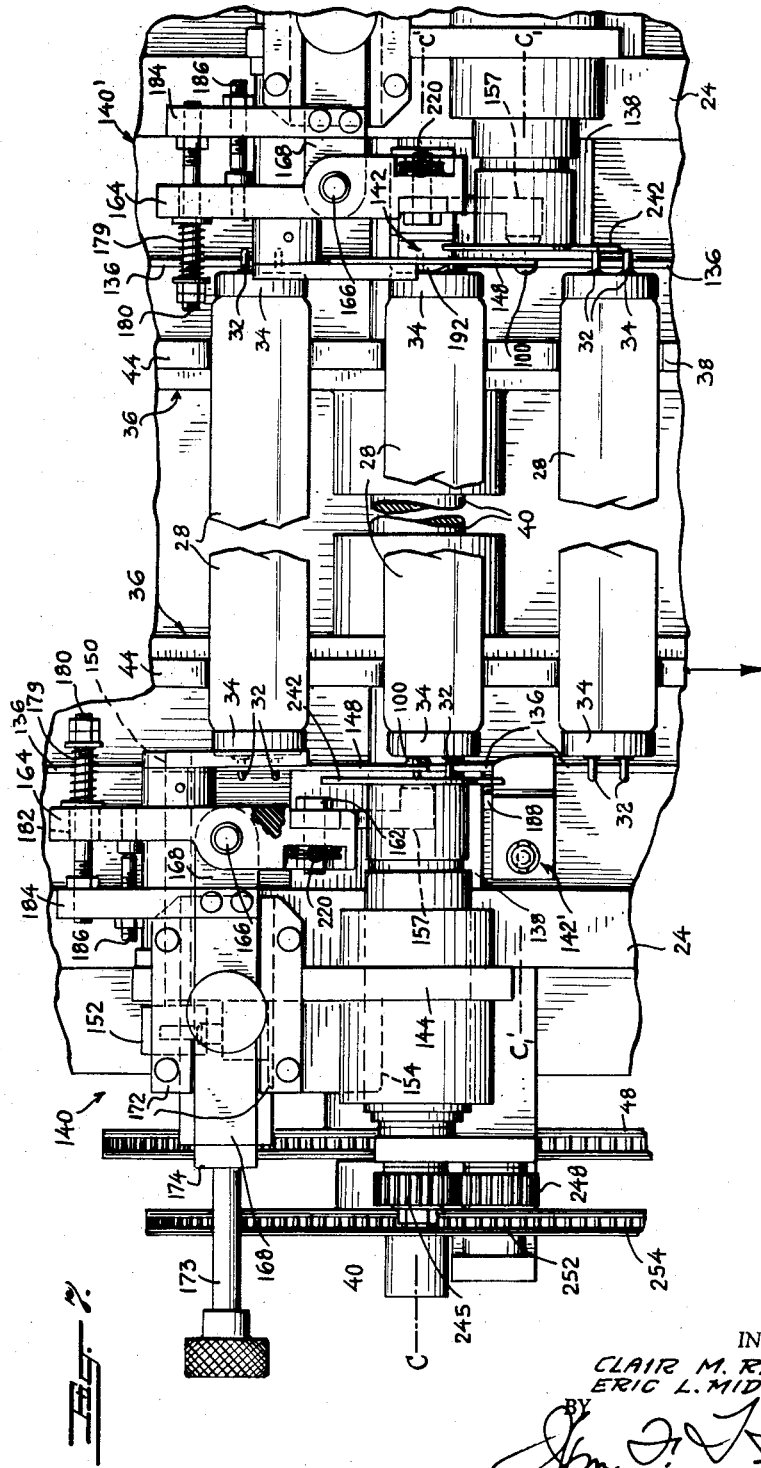
INVENTORS
CLAIR M. RIVELY and
ERIC L. MIDGLEY.
BY
ATTORNEY

United States Patent Office 2,903,561
Patented Sept. 8, 1959

2,903,561

WELDING APPARATUS

Clair M. Rively, White Meadow Lake, N.J., and Eric L. Midgley, Salem, Mass., assignors to Westinghouse Electric Corporation, East Pittsburgh, Pa., a corporation of Pennsylvania Application May 14, 1957, Serial No. 659,027

13 Claims. (Cl. 219—78)

The present invention relates to welding apparatus and, more particularly, to apparatus for welding a hollow tube to an elongated article protruding therefrom.

In the finishing of discharge lamps, such for example as fluorescent lamps, a base having hollow base pins and prefilled with cement is threaded over the lead wires on each end of the lamp with the lead wires extending through and projecting beyond the ends of the base pins.

Heretofore the protruding portions of the lead wires have been cut flush with the ends of the base pins and joined to the base pin with a flux type solder, which solder has been found to corrode to such an extent during long periods of stoarge in a warehouse, that the connections between the lead wires and the pins become defective and the lamps become inoperative. To eliminate corrosion, resort has been made to arc welding of the leads and pins but this has proven to be impractical with any known automatic welding equipment at present rates of lamp manufacture, namely, 750 lamps per hour or 3000 welds per hour.

The conventional automatic welding apparatus is impractical in this application because it requires that provision be made to feed and replace the welding electrodes periodically which feeding and replacement at the above mentioned production speeds would not be feasible without complicated and expensive automatic equipment. In addition, the conventional automatic welding equipment is complicated in structure and requires considerable maintenance for the many moving parts.

It is the general object of the present invention to avoid and overcome the foregoing and other difficulties of and objections to prior art practices by the provision of apparatus for automatically welding a hollow tube to an elongated article protruding therefrom which apparatus is simple in structure, provides maintenance free operation required of an efficient automatic production machine and eliminates the need for automatic devices for feeding and replacing the welding electrodes.

Another specific object of the present invention is the provision of a new and improved method of joining the lead wires of electric lamps to the metal parts of their bases.

An additional specific object of the present invention is the provision of a machine adapted to automatically weld the lead wire to the contact pin of the base on each end of a fluorescent lamp which machine insures a uniform length of the welded article, removes metallic oxides and salts produced by the welding operation and provides a clean welding electrode for each welding operation.

The aforesaid objects of the invention, and other objects which will become apparent as the description proceeds, are achieved by providing apparatus for welding a hollow tube to an elongated article protruding therefrom which apparatus comprises means for supporting the hollow tube with the elongated article protruding therefrom and for transporting the tube and article through a plurality of work stations, a grinding head disposed adjacent the path of movement of the tube and article for removing the protruding portion of said article and mechanically bonding the article to the tube, a welding head disposed adjacent the further path of movement of the bonded tube and article for fusing them together and a brushing head disposed adjacent the further path of movement of the welded tube and article for removing metallic oxides and salts produced by the fusion-welding operation from the welded juncture.

For a better understanding of the invention reference should be had to the accompanying drawings, wherein like numerals of reference indicate similar parts throughout the several views and wherein:

Fig. 1 is a side elevational view of the machine of the invention for welding the base pins of a based fluorescent lamp to the lead wires protruding from the base pins and showing the spiders, the tools for performing the successive operations on the lamp parts and the drive means for both.

Fig. 2 is an end elevational view of the machine of Fig. 1, along the line II—II of Fig. 1 in the direction of the arrows, and showing the grinding head, the welding head and the brushing head.

Fig. 3 is an enlarged fragmentary vertical sectional view of the machine of Fig. 1, along the line III—III of Fig. 1 in the direction of the arrows, and showing in greater detail the grinding head, welding head and brushing head.

Fig. 4 is a vertical sectional view of one end portion of the lamp and the grinding head along the line IV—IV of Fig. 3 in the direction of the arrows during the grinding operation and showing a positioning button on the grinding head and the means for adjusting the position of a grinding wheel of the grinding head with respect to the button.

Fig. 5 is a fragmentary enlarged horizontal sectional view of the adjacent portions of the lamp and the grinding wheel along the line V—V of Fig. 4 in the direction of the arrows, and showing one pin and the associated lead wire being ground and the adjacent pin and lead wire awaiting grinding.

Fig. 6 is a vertical sectional view of the lamp, the welding head and an electrode cleaning means, along the line VI—VI of Fig. 3 in the direction of the arrows, with portions of the lamp and frame of the machine broken away because of their length and showing a pusher head opposite the welding head and for insuring engagement of the base of the lamp with the positioning button.

Fig. 7 is a plan view of the machine of the present invention as illustrated in Fig. 1 and showing three lamps, the staggered welding heads, and pusher heads adjacent opposite ends of the lamp, and the welding electrode positioning means, with portions of the lamps and the frame of the machine broken away because of their length.

Fig. 8 is an enlarged vertical sectional view of a portion of the lamp and the brushes on the brushing head, along the line VIII—VIII of Fig. 3 in the direction of the arrows.

Fig. 9 is a further enlarged plan view of a portion of the lamp and the brushes, along the line IX—IX of Fig. 8 in the direction of the arrows.

Fig. 10 is an enlarged vertical sectional view of a base pin and a protruding lead wire at the start of the welding operation.

Fig. 11 is a view similar to Fig. 10 and a showing a portion of a grinding wheel and the parts after the severing and mechanically bonding operation.

Fig. 12 is a view of the welding electrode and the bonded base pin and lead wire during the welding operation and showing schematically the fusion-welding system.

Fig. 13 is a view similar to Figs. 10 and 11 of the welded base pin and lead wire and a portion of the wire brushes during the cleaning thereof.

Although the principles of the invention are broadly applicable to welding a hollow tube to an elongated article protruding therefrom, the invention is particularly adapted for use in conjunction with the welding of a lead wire to a base pin of a fluorescent lamp and hence it has been so illustrated and will be so described.

With specific reference to the form of the invention illustrated in the drawings, a frame (Figs. 1 and 2) of the welding machine or welding apparatus of the invention (Figs. 1–4 and 6–7) is indicated generally by the reference numeral 10. This frame 10 may comprise a table 12 supported on a pair of upper longitudinal channels 14, as viewed in Figs. 1 and 2, upper transverse channels 16 and legs 18 upstanding from the floor; lower longitudinal channels 20 integrated by lower transverse channels 22; and a pair of opposed end-support pedestals 24 (Figs. 1, 2 and 6 ribbed for reinforcement at 26 (Fig. 2) and secured by their flanged lower portions to the table 12.

To provide means for supporting a based fluorescent lamp 28 (Figs. 1–4 and 6–7) and transporting the lamp through the successive operations involved in the welding of a lead wire 30 to a base pin 32 on a base 34 of the lamp (Figs. 10, 11 and 12), a pair of annular spiders 36, are secured to a horizontal shaft 40 journalled in bearings 42 (Fig. 1) in the end-support pedestals 24. In order to insulate the frame 10 from a welding potential hereinafter to be described, the outer peripheral portion of each of the spiders 36 (Fig. 6) is provided with a ring 44, fabricated from a suitable dielectric material, such as Micarta, which material is manufactured from a paper impregnated with phenol-formaldehyde resins and compressed under heat by the Westinghouse Electric Corporation of Pittsburgh, Pennsylvania. Such rings 44 are provided with horizontally aligned serrations or notches 38 to provide a cradle for the lamp 28.

As shown, the shaft 40, spiders 36 and the lamps 28 are continuously rotated in a clockwise direction, as viewed in Fig. 2 (counterclockwise as viewed in Fig. 3), by a sprocket 46 secured to the shaft 40 and connected by a chain 48 (Figs. 1 and 2) to a drive sprocket 50 on the output shaft 52 of a gear reduction drive 54 affixed to lower transverse channels 22, which gear reduction drive in turn is driven by a pulley 56 on its input shaft 58, a belt 60 and a pulley 62 on a motor 64 mounted in adjacent channels 22.

As the spiders 36 continuously move in clockwise direction, as viewed in Fig. 2, the lamp receiving notches 38 (Figs. 1 and 2) momentarily register at position A of Fig. 2 with the delivery end of a pair of inclined lipped loading rails 66 (Fig. 1) secured by end brackets 68 to the table 14 and the lamp 28 rolls off the rails 66 into the registering notches 38. As shown in Fig. 1 the brackets 68 are integrated by a transverse rod 70. The lamp 28 is retained in the notches 38 by engagement of the base pins 32 with retaining plates 72 (Figs. 2 and 3) which may be formed as extensions of the lips on the rails 66 and which follow the periphery of the spiders 36 in the direction of spider rotation.

Grinding heads

Substantially midway between the lamp loading position "A" for a lamp 28 and the grinding position "B" (Figs. 2 and 3) adjacent a pair of axially aligned grinding heads, the base pins 32 on each end of the lamp 28 leave the retaining plates 72 and ride up an alignment track 74 which is mounted by bolts to one of the end plates 76 (Figs. 3 and 4) of a frame for each grinding head. To prevent damage to the lamp 28 during the grinding operation and to provide a resilient mounting for the grinding head, the plates 76, which are integrated by a top plate 78 and a bottom plate 80 (Fig. 3) are limitedly rotatable on a fixed shaft 82 secured in a U-shaped bracket 84 fastened to the end support pedestal 24. These end plates 76 are biased in clockwise direction, as viewed in Fig. 4, by a compression spring 86 provided on a headed bolt 88 carried in a slot in the bottom plate 80, which bolt is adjustably threaded into the end support pedestal 24. As shown in Figs. 2 and 3, the shaft 82 is also supported in a bracket 90 affixed to the end support pedestal 24.

As the base pins 32 become aligned in a plane tangent to the periphery of the spiders 36 by engagement with the alignment track 74, such base pins are held in this aligned position by a retaining arm 92 which is pivoted at 93 on the right-hand end plate 76, as viewed in Fig. 3, and biased counterclockwise by a spring 94. The continued counterclockwise rotation of the spiders 36, as viewed in Fig. 3 (clockwise as viewed in Fig. 2) brings the aligned secured base pins 32 on each end of the lamp base 34 (Fig. 10) to position B (Figs. 2 and 3) where they are successively engaged by a pair of axially aligned and continuously rotating grinding wheels 96 (Figs. 4 and 5) affixed by washers and a nut to a shaft 98, which wheels 96 remove the protruding portion of each lead wire 30 (Fig. 11) and mechanically bond each lead wire 30 to its associated base pin 32 to provide a clean welding surface and a good electrical contact therebetween.

To insure uniform overall length of the ground pins 32 despite variations in the overall length of the lamps 28 or angular disposition of the bases 34 with respect to the envelope of the lamp 28, a positioning button 100 (Fig. 4) projects from the side wall of the aligning track 74 adjacent the grinding wheel 96 at opposite ends of the lamp 28, which button 100 engages the contiguous face of the base 34 to properly position the grinding wheel 96 a predetermined distance from the base. In order to catch pieces of metal ground from the wire 30 and pin 32, an open sided hooded chute 101 (Figs. 1–4) is mounted on the end-plate 76 and substantially surrounds each grinding wheel 96.

In order to provide an adjustable mounting for the grinding wheel 96 of each grinding head, a shaft bearing 102 is secured to a slide 104 movable in a dovetail guide 105 (Fig. 3) in the top plate 78 of the frame for the grinding head. For moving the slide 104, a headed bolt 106 (Fig. 4) rotatable in a lug 108 depending from the top plate 78 has its threaded inner portion, as viewed in Fig. 4, in engagement with a hollow threaded portion 110, of the slide 104. For the purpose of securing the slide 104 in any adjusted position, a locking bolt 112 is threadable through the top plate 78 into engagement with the adjusted slide 104.

To continuously rotate each of the shafts 98 carrying the grinding wheels 96 and disposed at opposite ends of the path of movement of a lamp 28, a pulley 114 is connected to the end of each of the shafts 98 (Figs. 2 and 3) which is driven by a belt 116 extending from one side of a double pulley 118 journalled on the fixed shaft 82. This pulley 118 is in turn driven by a belt 120 (Fig. 2) extending from a motor 122 secured to vertical straps 124 (Fig. 1) disposed between the channels 14 and 20 of the frame 10, with such belt 120 (Fig. 2) passing around a pair of idler pulleys 128 and 130 mounted below the channel 16 (Fig. 2) and also passing around a pulley 132 on a drive shaft 134 of the brushing head, adjacent position D of Fig. 2.

After the lead wires 30 have been severed and the base pins 32 have been mechanically bonded to the lead wires 30 by the grinding heads, such as shown in Fig. 11, further rotation of the spiders 36 moves the aligned base pins 32 off the alignment track 74 onto a continuation track 136 (Figs. 2–3 and 6–7) secured to, and electrically grounded to, a bracket 138 on the left-hand end-support pedestal 24, as viewed in Fig. 6, and toward the welding position C (Figs. 2 and 3).

Welding heads

It will be understood from a consideration of Fig.

7 that as the spiders 36 carry a lamp 28 in the direction of the arrow (from the top to the bottom of the figure), the base pins 32 on the left-hand end and right-hand end of the lamp 28 are riding on the tracks 136 and first engage a left-hand welding head 140 and a right-hand pusher head 142 respectively, the longitudinal axis of which heads is indicated by the line CC' (Fig. 7). During this engagement the left-hand base pins 32 are welded by the left-hand welding head 140. The welded left-hand and unwelded right-hand base pins 32 of the lamp are then moved into engagement with a left-hand pusher head 142' and a right-hand welding head 140' respectively, the longitudinal axis of which heads are represented by the line $C_1'C_1$ (Fig. 7) in which position welding of the base pins 32 on the right hand end of the lamp 28 occurs. As apparent from Fig. 3 the axes CC' and $C_1'C_1$ shown in Fig. 7 lie in planes along lines C and $C_1'$, respectively, which lines are offset $\alpha°$ from each other.

To mount each of the welding heads 140 and 140' on the frame 10 of the welding apparatus, a mounting plate 144 (Figs. 2–3 and 6–7) is secured by bolts to the end-support pedestal 24. As the base pins 32, for example on the left-hand end of the lamp 28, as viewed in Fig. 7, are moved toward position C (Fig. 3), the first welding position, the base pins engage a shoe arm 148 (Figs. 2–3, 6–7 and 12) carried on a shaft 150 which is journalled in the mounting plate 144. Counterclockwise movement of the shoe arm 148, as viewed in Fig. 2 (clockwise as viewed in Fig. 3) by the leading base pin 32 moves a depending operating arm 152 on the shaft 150 (on the opposite side of the mounting plate 144) in a similar direction to close a normally-open microswitch 154 secured to the lower portions of the mounting plate 144, thereby energizing a fusion-welding system (Fig. 12). This system supplies welding power across the gap between the base pin 32 and an electrode 157 disposed along the further path of movement of the base pin 32, as hereinafter explained in detail. To normally bias the shoe arm 148 into engagement with the track 136 or a base pin 32, a spring block 158 is affixed to the mounting plate 144 adjacent the operating arm 152 and houses a compression spring 160 which bears against the operating arm 152.

For the purpose of providing a vertical adjustment for the electrode 157, the electrode is secured by bolts 162 (Figs. 3 and 7) carried in a vertical adjustment slot in a lever 164 of dielectric material pivoted at 166 on a slide 168. To permit longitudinal adjustment of the electrode 157 and resultant setting of the gap between such electrode 157 and the continuously moving base pins 32 on the lamp 28, the slide 168 (Fig. 3) is reciprocable in a dovetail guide 170 provided in a guide block 172 affixed to the upper portions of the mounting plate 144 adjacent the shaft 150, by means similar to the positioning means employed for the grinding wheel 96 at position B of Figs. 2 and 3. This positioning means may comprise a bolt 173 (Fig. 7) rotatable in a bracket 174 affixed to the end-support pedestal 24, which bolt has its right-hand inner end, as viewed in Figs. 6 and 7, in engagement with a threaded hollow portion (not shown) of the slide 168. In like manner a locking bolt 176 (Figs. 2, 3 and 6) may be threaded into a cover (not shown) of the guide block 172 to secure the slide 168 in the block 172 when the desired longitudinal adjustment of the electrode 157 has been accomplished. In order to provide a uniform gap between the electrodes 157 and the path of movement of a base pin 32 and maintain the welding face of the electrode 157 parallel to the moving base pins 32 during the welding operation, a compression spring 179 (Fig. 7) carried by a bolt 180 extending through a clearance hole 182 in the lever 164 and carried by an arm 184 extending laterally from the slide 168, biases the lever 164 in counterclockwise direction (as viewed in Fig. 7) against an adjustable stop 186 on the arm 184.

Pusher head

As hereinbefore mentioned the pusher head 142 (Figs. 6 and 7) is aligned longitudinally along the line CC' of Fig. 7 with the left-hand welding head 140, and is employed to exert spring pressure against the right-hand base 34 of the lamp 28 to position the left-hand base 34 against a second positioning button 100 carried by the track 136 underneath the electrode 157 (which are identical to the button 100 and alignment track 74) thereby accurately positioning the left-hand base pins 32 and determining the gap between the electrode 157 and such base pins 32. In order to support the pusher head 142, a mounting arm 188 (Fig. 6) extends laterally from the track-supporting bracket 138 and carries a bifurcated body 190 of the pusher head 142. For the purpose of pressing a pusher plate 192 adjustably secured to an arm 194 (pivoted at 196 between the bifurcations in the body 190) against the right-hand base 34, a compression spring 198, which encircles a bolt 200 extending through the arm 194 and is secured in a plate 202 upstanding from the body 190, bears against the arm 194. The pusher plate 192 engages the right-hand base 34, as viewed in Fig. 7, during the successive welding of the lead wires 30 to the base pins 32 on the opposite end of the lamp 28 by the fusion-welding system.

Fusion welding system

It will be understood that each individual fusion-welding system (Fig. 12), associated with each of the welding heads 140 and 140' consists of a "weld-power" circuit for delivering welding potential to the electrode 157 and a base pin 32 as it slowly passes by the latter; a "high-frequency-generator" circuit for initiating the discharge across the gap between the electrode 157 and the base pin 32 during each half-cycle of the welding potential; and a "timer energization" circuit for controlling the length of time the high-frequency output from the "high-frequency-generator" circuit and welding potential from the "weld-power" circuit are applied between the electrode and the base pin.

The "weld-power" circuit (Fig. 12) extends from one side of a conventional voltage supply, indicated generally by the legend "440 v. A.C.," through one side of a manually operated switch 204, through a conductor 206 to one side of a choke or ballasting inductance 208, from the other side of the choke 208 to one side of a normally open contact 210 of a relay 212 in the "timer energization" circuit, from the other side of the contact 210 through a conductor 214 to one side of a secondary winding 216 of a pulse transformer 218, for superimposing the high-frequency output of the "high-frequency-generator" circuit on the "weld-power" circuit, and from the other side of such winding 216 through a conductor 220 (Figs. 6, 7 and 12) to the electrode 157. The bottom track 136 on which the base pin 32 rides is connected by a conductor 222 to ground (Figs. 6 and 12) and to the other side of the manually operated switch 204 and hence to the other side of a voltage supply. However, welding power from the "weld-power" circuit is not supplied across the gap between the electrode 157 and the moving base pin 32 until the breakdown of said gap and the initiation of the welding arc across the electrode 157 and the base pin 32 by the output of the "high-frequency-generator" circuit.

The "timer energization" circuit extends from a junction point with the line voltage conductor 222 through a conductor 224 to one side of a conventional timer 226, from the other side of the timer 226 through a conductor 228 to one side of the normally open, but now closed, microswitch 154 (Figs. 2, 3, 6 and 12) and from the other side of this switch 154 through a conductor 230 to a junction point with the line voltage conductor 206. As shown in Fig. 12, a primary winding 232 of a transformer 234 employed for supplying power to the "high-frequency-generator" circuit and the relay 212 are suitably paralleled with the timer 226. Hence, closure of the switch 154 by the operating arm 152, when the base pin 32 engages the shoe arm 148, energizes this "timer-energization" circuit to render the "high-frequency-generator" circuit also operative.

The "high-frequency-generator" circuit comprises a high-voltage secondary winding 236 of the transformer 234, which winding 236 is connected by suitable conductors with spaced electrodes 238 of a spark gap and includes a tank circuit comprising a primary winding 240 of the aforementioned pulse transformer 218 and a capacitance 242 resonantly tuned to provide a high-frequency-generating output in the secondary winding 216 of the pulse transformer 218 in the "weld-power" circuit.

Hence, upon closure of the switch 154 in the "timer-energization" circuit by the operating arm 152, the timer 226 is energized, which timer in turn permits first, the energization of the primary winding 232 of the transformer 234 with attendant energization of the "high-frequency-generator" circuit and secondly the energization of the relay 212 with resultant closing of the normally-open contact 210 in the "weld-power" circuit. When the energy from the "high-frequency-generator" circuit and the "weld-power" circuit are simultaneously applied to the electrode 157 and the base pin 32, the gap between the electrode 157 and the base pin 32 becomes ionized, during each half-cycle of welding power from the "weld-power" circuit, by the high-frequency output of the "high-frequency-generator" circuit thereby reducing the resistance across said gap and permitting welding current to follow the high-frequency output of the "high-frequency-generator" circuit across said gap. When the timer 226 "runs out," the "high-frequency-generator" circuit and the relay 212 are deenergized thereby interrupting the "weld-power" circuit by the opening of the contact 210. Meanwhile, the previously bonded lead wire 30 and base pin 32 have been fused together by the energy supplied by the fusion-welding system to form a good electrical weld thereof.

After the next or lagging lead wire 30 and base pin 32 of the pair has been similarly fused together by the fusion-welding system and the lagging base pin 32 moves out of engagement with the shoe arm 148, one of the blades of a scraping wheel 242 (Figs. 3, 6 and 7) secured to a shaft 244 journalled in the mounting plate 144, moves across the welding face of the electrode 157 to remove welding flash therefrom.

*Electrode cleaning assembly*

It will be understood that the three equi-spaced blades (Fig. 3) of the scraping wheel 242 of an electrode cleaning assembly are rotated in clockwise direction, as viewed in Fig. 3 at a constant speed by conventional means connecting the shaft 244 to the shaft 40 (Fig. 2) of the drive mechanism for the spiders 36, so that the rotating blades are continuously juxtaposed about, but never in contact with, the base pins 32 during the fusion-welding thereof.

As shown in Figs. 2 and 6 this conventional drive means may consist of a gear 245 on a shaft 246 which meshes with a gear 248 (Fig. 6) on a stud shaft 250 journalled in the mounting plate 144, which stud shaft 250 also carries a sprocket 252 connected by a chain 254 to a sprocket 256 on the shaft 40.

When the lead wires 30 on the right-hand end of the lamp 28, as viewed in Fig. 7, have been similarly welded by the welding head 140', the spiders 36 move the lamp 28 with the welded base pins 32 still riding on the track 136 to position D (Fig. 3) where aligned brushing heads (Figs. 8, 9 and 13) simultaneously remove metallic oxides and salts produced by the fusion-welding operation from the base pins 32 and the base 34.

*Brushing heads*

To provide a mount for each of the opposed brushing heads (Figs. 2, 3, 8, 9 and 13) which are aligned with respect to the lonigtudinal axis of the moving lamp 28, a bracket 258 (Figs. 2, 3 and 8) for supporting a guide block 260 is secured to the end-support bracket 24. For the purpose of permitting the adjustment of each brushing head longitudinally with respect to the axis of the lamp 28, the aforementioned shaft 134 is journalled in a bearing 262 (Figs. 2, 3 and 8) which is mounted transverse to the longitudinal axis of the moving lamp 28 on the slide 264 reciprocable in a dovetail guide 266 in the guide block 260 by means similar to that employed for the grinding heads and welding heads. This reciprocating means for the slide 264 (Figs. 2, 3 and 8) may consist of a headed bolt 268 rotatable in an extension 270 of the guide block 260 and having its threaded inner end, as viewed in Fig. 8, in engagement with a threaded hollow portion of the slide 264. As in the case of the grinding heads and welding heads, a lock bole (not shown) may be threadable through a slide retaining cover 272 (Fig. 3) to secure the slide 264 in the desired position. The rotatable brush assembly comprises a nylon brush 274 and a relatively smaller wire brush 276 secured in abutting engagement on the end of the shaft 134, as viewed in Figs. 3 and 8, by washers and nuts, and which clean the contiguous face of the base 34 and the base pins 32, respectively, upon rotation, as can be appreciated from Fig. 9.

In order to expose the face of the base 34 to the nylon brush 274, the track 136 (Fig. 3) terminates in a radial line just ahead of the nylon brush 274. For the purpose of preventing rotation of the lamp 28 by engagement of the leading welded base pin 32 with the wire brush 276 and resultant loss of contact between portions of the oxide coated base and pins 32 and the brushes 274 and 276, a lipped retaining plate 278 (Fig. 3) is mounted on the track 136 to engage the top of the lagging base pin 32 after the leading base pin 32 has moved completely off of the track 136.

After the simultaneous removal of the metallic oxides and salts produced by the fusion-welding operation by the brushing heads, the spiders 36 move the welded and cleaned lamp 28 to position E of Fig. 2, the unloading position, where the notches 38 momentarily register with a pair of downwardly inclined and lipped guide rails 280 mounted on brackets 282 (Fig. 2) upstanding from the end-support pedestals 24 and integrated by a transverse rod 283 (Figs. 1 and 2) thereby permitting the lamp 28 to roll, by gravity, out of the notches 38 and onto the rails 280 from which they may be transported by an operator or by automatic means (not shown) to the next operation.

It will thus be obvious to those skilled in the art that a welding apparatus and method have been provided for automatically welding a hollow tube to an elongated article protruding therefrom. In addition, this welding apparatus is simple in structure and provides the desirable maintenance free operation required of efficient automatic production machinery. Further, the welding apparatus eliminates the need for automatic devices for feeding and replacing welding electrodes. Specifically, a welding apparatus and method have been provided for automatically fusing the lead wire to the base contact pin on each end of a fluorescent lamp, which apparatus and method insures a uniform length of the welded base pin and removes the metallic oxides and salts produced by the fusion-welding operation. A further advantage is the provision of a clean welding electrode for each welding operation.

While in accordance with the patent statutes, one best-known embodiment of the invention has been illustrated and described in detail, it is to be particularly under-

We claim:

1. A machine for welding a base pin of a base on the opposite ends of a fluorescent lamp to a lead wire protruding from said base pin, comprising means for supporting said lamp and operable to move said lamp to successively present the base pins thereof to a plurality of work stations, means disposed at one work station adjacent the path of movement of said lamp for removing the protruding portion of each of said lead wires and for mechanically bonding the remaining end thereof to its associated base pin to thereby provide a clean welding surface with a good electrical contact therebetween, and means disposed at another work station adjacent the further path of movement of said lamp for applying a welding potential to said bonded base pins and its associated lead wire to fuse them together thereby forming a good electrical weld thereof.

2. A machine for welding a base pin of a base on the opposite ends of a fluorescent lamp to a lead wire protruding from said base pin, comprising support means carried by said machine for receiving said lamp and operable to move said lamp through a plurality of work stations, removing and bonding means disposed at one work station adjacent the further path of movement of the lamp and at the opposite ends of said lamp and operable to remove the protruding portion of each of said lead wires and for mechanically bonding the remaining end thereof to its associated base pin to thereby provide a clean welding surface and a good electrical contact therebetween, means carried by each of said removing and bonding means engageable with the adjacent base for determining the spacing therebetween during the removing and bonding operation on the adjacent base pin and lead wire, and means disposed at still another work station adjacent the further path of movement of said lamp for applying a welding potential to each bonded base pin and lead wire to fuse them together thereby forming a good electrical weld thereof.

3. A machine for welding a base pin of a base on the opposite ends of a fluorescent lamp to a lead wire protruding from said base pin, comprising means carried by said machine for supporting said lamp and operable to move said lamp through a plurality of work stations, removing and bonding means disposed at one work station adjacent the further path of movement of the lamp for removing the protruding portion of each of said lead wires from said aligned base pins and for mechanically bonding the remaining end of said lead wires to its associated base pin to thereby provide a clean welding surface with a good electrical contact therebetween, potential applying means disposed at a second work station adjacent the further path of movement of said lamp and at opposite ends of said lamp and for applying a welding potential to each bonded base pin and lead wire to fuse them together thereby forming a good electrical weld thereof, spacing means carried by each of said potential applying means engageable with the adjacent base for determining the spacing therebetween during the welding operation on said adjacent base pin and lead wire, and pusher means also disposed at said second work station for resiliently engaging the base on one end of the lamp while the base pin on the other end of said lamp is being welded by the potential applying means to push the base on said other end of said lamp against said spacing means.

4. A machine for welding a base pin of a base on the opposite ends of a fluorescent lamp to a lead wire protruding from said base pin, comprising means adjacent said machine for feeding said lamp thereto, means carried by said machine for supporting said lamp after receipt thereof from said feeding means and operable to move said lamp through a plurality of work stations, means disposed along the path of movement of said lamp to align the base pin on each end of said lamp for a welding operation, removing and bonding means disposed at one work station adjacent the further path of movement of the lamp for removing the protruding portion of each of said lead wires from said aligned base pins and for mechanically bonding the remaining end of said lead wires to its associated base pin to thereby provide a clean welding surface with a good electrical contact therebetween, and means disposed at another work station adjacent the further path of movement of said lamp for applying a welding potential to each aligned bonded base pin and lead wire to fuse them together thereby forming a good electrical weld thereof.

5. A machine for welding a base pin of a base on the opposite ends of a fluorescent lamp to a lead wire protruding from said base pin, comprising support means carried by said machine for receiving said lamp and operable to move said lamp through a plurality of work stations, means disposed at one work station along the path of movement of said lamp for aligning the base pin on each end of said supported lamp for a welding operation, removing and bonding means disposed at another work station adjacent the further path of movement of the lamp and at opposite ends of said lamp and operable to remove the protruding portion of each of said lead wires and for mechanically bonding the remaining end thereof to its associated base pin to thereby provide a clean welding surface and a good electrical contact therebetween, means carried by each of said removing and bonding means engageable with the adjacent base for determining the spacing therebetween during the removing and bonding operation on the adjacent base pin and lead wire, and means disposed at still another work station adjacent the further path of movement of said lamp for applying a welding potential to each aligned bonded base pin and lead wire to fuse them together thereby forming a good electrical weld thereof.

6. A machine for welding a base pin of a base on the opposite ends of a fluorescent lamp to a lead wire protruding from said base pin, comprising means carried by said machine for supporting said lamp and operable to move said lamp through a plurality of work stations, guide means disposed along the path of movement of said supported lamp for maintaining said supported lamp on said supporting means, removing and bonding means disposed at one work station adjacent the further path of movement of the lamp for removing the protruding portion of each of said lead wires from said base pins and for mechanically bonding the remaining end of said lead wires to its associated base pin to thereby provide a clean welding surface and a good electrical contact therebetween, and potential applying means disposed at another work station adjacent the further path of movement of said lamp for applying a welding potential to each bonded pin and lead wire to fuse them together thereby forming a good electrical weld thereof, each of said potential applying means having an electrode disposed adjacent the path of movement of the adjacent bonded base pin and lead wire and means engageable by the adjacent base pin during its path of movement for initiating a welding potential and for holding said base pin during the welding operation.

7. Apparatus for welding a hollow tube to an elongated article protruding therefrom, comprising means carried by said apparatus for supporting said tube and operable to move said tube and said elongated article through a plurality of work stations, removing and bonding means disposed at one work station adjacent the path of movement of said tube for removing the protruding portion of said elongated article from said tube and for mechanically bonding the remaining end of said elongated article to said tube to thereby provide a clean welding surface and a good electrical contact therebetween, and means disposed at another work station adjacent the further path of movement of said bonded tube for applying a welding potential to said bonded tube and elongated article to fuse them together thereby forming a good electrical weld thereof.

8. A machine for welding a base pin on the opposite ends of a fluorescent lamp to a lead wire protruding from said base pin, comprising a pair of loading rails adjacent said machine for feeding said lamp thereto, a pair of spiders carried by said machine for supporting said lamp after receipt thereof from said guide rails and operable to move said lamp through a plurality of work stations, a pair of retaining plates disposed along the path of movement of said supported lamp for maintaining said lamp on said spiders, an alignment track disposed adjacent the further path of movement of said lamp and at opposite ends of said lamp for aligning said base pins in a predetermined position for a welding operation, a grinding head disposed at a first work station adjacent the further path of movement of said lamp and at opposite ends of said lamp for removing the protruding portion of each of said lead wires from said base pins and mechanically bonding the remaining end of said lead wires to its associated base pin to thereby provide a clean welding surface and a good electrical contact therebetween and a welding head disposed at a second work station adjacent the further path of movement of said lamp and at opposite ends of said lamp for applying a welding potential to each aligned bonded base pin and lead wire to fuse them together thereby forming a good electrical weld thereof.

9. A machine for welding a base pin on the opposite ends of a fluorescent lamp to a lead wire protruding from said base pin, comprising a pair of loading rails adjacent said machine for feeding said lamp thereto, a pair of spiders carried by said machine for supporting said lamp after receipt thereof from said guide rails and operable to move said lamp through a plurality of work stations, a pair of retaining plates disposed along the path of movement of said supported lamp for maintaining said lamp on said spiders, an alignment track disposed adjacent the further path of movement of said lamp and at opposite ends of said lamp for aligning said base pins in a predetermined position for a welding operation, a grinding head disposed at a first work station adjacent the further path of movement of said lamp and at opposite ends of said lamp for removing the protruding portion of each of said lead wires from said base pins and mechanically bonding the remaining end of said lead wires to its associated base pin to thereby provide a clean welding surface and a good electrical contact therebetween, a positioning button carried by each of said grinding heads engageable with the adjacent base for determining the spacing therebetween during the removing and bonding operation on the adjacent base pin and lead wire, a retaining arm disposed adjacent each of said alignment tracks at said first work station for holding said base pins in the aligned position on said alignment tracks during the removing and bonding operation, a welding head disposed at a second work station adjacent the further path of movement of said lamp and at opposite ends of said lamp for applying a welding potential to each aligned bonded base pin and lead wire to fuse them together thereby forming a good electrical weld thereof.

10. A machine for welding a base pin on the opposite ends of a fluorescent lamp to a lead wire protruding from said base pin, comprising a pair of spiders carried by said machine for supporting said lamp and operable to move said lamp through a plurality of work stations, a grinding head disposed at a first work station adjacent the further path of movement of said lamp and at opposite ends of said lamp for removing the protruding portion of each of said lead wires from said base pins and mechanically bonding the remaining end of said lead wires to its associated base pin to thereby provide a clean welding surface and a good electrical contact therebetween, a welding head disposed at a second work station adjacent the further path of movement of said lamp and at opposite ends of said lamp for applying a welding potential to each bonded base pin and lead wire to fuse them together thereby forming a good electrical weld thereof, each of said welding heads being angularly displaced from each other along the periphery of said spiders and having an electrode disposed adjacent the path of movement of said adjacent bonded base pin and lead wire, a positioning button engageable with the adjacent base for determining the spacing between said electrode and said bonded base pin and lead wire, a shoe adjacent said second work station engageable by said bonded base pin during its path of movement for initiating a welding potential and for holding said bonded base pin during the welding operation on said adjacent base pin and lead wire, and a scraping wheel on each of said welding heads for removing welding flash from said electrode after each welding operation, a pusher head also disposed at said second work station, at opposite ends of said lamp and aligned with a welding head at the opposite end of said lamp for resiliently engaging the base on one end of the lamp while the bonded base pin on the other end of said lamp is being welded by the welding head and for pushing the base on said other end of said lamp against said positioning button on said welding head.

11. The method of welding a base pin of a base on the opposite ends of a fluorescent lamp to a lead wire protruding from said base pin, comprising the steps of supporting said lamp, aligning the base pin on each end of said supported lamp for a welding operation, removing the protruding portion of each of said lead wires and mechanically bonding each of said lead wires to its associated base pin to thereby provide a clean welding surface and a good electrical contact therebetween and applying a welding potential to each bonded base pin and lead wire to fuse them together thereby forming a good electrical weld thereof.

12. The method of welding a base pin of a base on the opposite ends of a fluorescent lamp to a lead wire protruding from said base pin, comprising the steps of supporting said lamp, aligning the base pin on each end of said supported lamp for a welding operation, holding the lamp in the aligned position, removing the protruding portion of each of said lead wires and mechanically bonding each of said lead wires to its associated base pin to thereby provide a clean welding surface and a good electrical contact therebetween, applying a welding potential to each bonded base pin and lead wire to fuse them together thereby forming a good electrical weld thereof and cleaning said fused base pin and lead wire.

13. The method of welding a hollow tube to an elongated article protruding therefrom, which comprises the steps of supporting said tube, aligning said tube in a predetermined position for a welding operation, removing the protruding portion of said elongated article and mechanically bonding said elongated article to said tube to thereby provide a clean welding surface and a good electrical contact therebetween, applying a welding potential to said bonded tube and elongated article to fuse them together thereby forming a good electrical weld thereof.

References Cited in the file of this patent

UNITED STATES PATENTS

| | | |
|---|---|---|
| 1,361,652 | Wetmore | Dec. 7, 1920 |
| 2,749,528 | Albrecht | June 5, 1956 |